United States Patent Office 3,056,835
Patented Oct. 2, 1962

3,056,835
PROCESS FOR THE PREPARATION OF CARBODIIMIDES
John J. Monagle, Jr., Wilmington, Del., and Harold Russ Nace, Providence, R.I., assignors to E. I. du Pont de Nemours and Company, Wilmington, Del., a corporation of Delaware
No Drawing. Filed July 24, 1961, Ser. No. 125,929
3 Claims. (Cl. 260—551)

This invention is directed to a new process for the preparation of carbodiimides. Carbodiimides such as diphenylcarbodiimide are known. These compounds have been described in Chemical Reviews, Vol. 53 (1953), pages 145–166, and in Chemistry of Carbon Compounds, Vol. III–A, page 205, Elsevier Publishing Company (1954). In general, these carbodiimides have been prepared by treating a disubstituted thiourea with a metallic oxide, such as mercuric oxide. This method of preparation is not entirely satisfactory in view of the attendant side reactions, such as the reaction of the water by-product with the carbodiimides to form a urea. Accordingly, it would be highly desirable to provide a process for the preparation of these carbodiimides which is free of these undesirable features. In addition, this type of process is not satisfactory for the preparation of polymeric compounds containing a plurality of carbodiimide linkages.

It is an object of the present invention to provide a process for the preparation of carbodiimides. A further object is to provide a process for the preparation of carbodiimides involving the treatment of isocyanates with catalytic amounts of certain phosphates, phosphonates, phosphonamides, phosphoramides and triarylamido phosphates.

These and other objects will become apparent in the following description and claims.

More specifically, the present invention is directed to a process for preparing organic carbodiimides by treating an organic isocyanate with a catalytic amount of a compound taken from the group consisting of (1) phosphates of the formula $(RO)_3PO$, (2) phosphates of the formula $(R''O)_3PO$, (3) phosphonates of the formula $(RO)_2P(O)R'$ (4) phosphoramides of the formula $(R_2N)_3PO$, (5) phosphonamides of the formula $(R_2N)_2P(O)R'$ and (6) triarylamidophosphates of the formula $(R''NH)_3PO$, in which catalysts R and R' are selected from the group consisting of alkyl groups of 1 to 19 carbons, alkenyl groups of 2 to 12 carbons and haloalkyl groups of 1 to 12 carbons, and R'' is selected from the group consisting of phenyl, lower alkyl phenyl, lower alkoxy phenyl and halo phenyl groups. The reaction involved occurs between two isocyanate groups with the formation of a carbodiimide linkage and the liberation of carbon dioxide.

In carrying out the process of the present invention, any organic isocyanate, including monoisocyanates and polyisocyanates, may be used, such as aromatic, aliphatic or cycloaliphatic types. These organic isocyanates may contain other substituents; however, it is readily apparent that these substituents should not be reactive with the isocyanate group or groups. Therefore, they should not be of the active hydrogen-containing type which display activity according to the Zerewitinoff test.

When using an organic monoisocyanate, such as phenylisocyanate, to prepare an organic carbodiimide, the process of the present invention may be illustrated as follows:

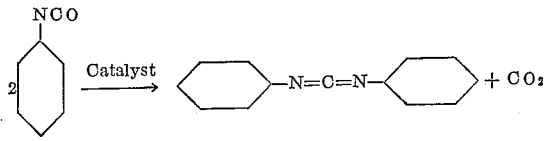

Representative organic monoisocyanates which may be used are methylisocyanate, ethylisocyanate, butylisocyanate, octylisocyanate, octadecylisocyanate, allylisocyanate, vinylisocyanate, pentylisocyanate, phenylisocyanate, o-tolueneisocyanate, p-tolueneisocyanate, o-nitrophenylisocyanate, p-chlorophenylisocyanate, p-methoxyphenylisocyanate, 4-biphenylisocyanate, cyclohexylisocyanate, and decahydronaphthaleneisocyanate. It is to be understood that mixtures of these monoisocyanates may be used to form unsymmetrical or mixed carbodiimides.

The process of the present invention may also be carried out by using a polyisocyanate, such as a di- or triisocyanate. When using an organic diisocyanate, according to the process of the present invention, a condensation polymer having repeating carbodiimide linkages is prepared which is of a high molecular weight and is substantially linear. The use of an organic diisocyanate may be illustrated as follows:

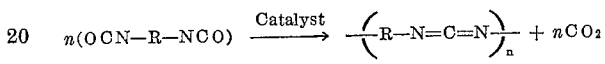

wherein R is a bivalent organic radical and n is an integer greater than 2. Organic diisocyanates which may be used in the process of the present invention include toluene 2,4-diisocyanate, m-phenylene diisocyanate, 4-chloro-1,3-phenylene diisocyanate, 4,4'-biphenylene diisocyanate, 1,5-naphthalene diisocyanate, tetramethylene diisocyanate, hexamethylene diisocyanate, decamethylene diisocyanate, 1,4-cyclohexylene diisocyanate, 4,4'-methylene-dicyclohexylene diisocyanate, and 1,5-tetrahydronaphthalene diisocyanate. Mixtures of two or more of these organic diisocyanates may be used, in which case the bivalent organic radical R in the above formula will not be the same in each recurring unit. It is also to be understood that isocyanate-terminated polymer may be used in the process of the present invention so as to prepare substantially linear polymers containing a plurality of intralinear carbodiimide linkages. Representative isocyanate-terminated polymers which may be used include the reaction products of a polymer having terminal hydroxyl, amino, or carboxyl groups with a molar excess of an organic diisocyanate. Thus, for example, a glycol such as a polyalkyleneether glycol or a polyester glycol may be reacted with a molar excess of an organic diisocyanate so as to provide an isocyanate-terminated polyurethane. Here again it is to be understood that mixtures of two or more different isocyanate-terminated polymers may be used in the process of the present invention, in which case the bivalent organic radical R in the above formula will not be the same in each recurring unit. It is readily apparent that any of a wide variety of isocyanate-terminated polymers may be used in the process of the present invention.

It is also to be understood that compounds containing more than two free isocyanate groups may also be used in the process of the present invention. In this case, the resulting organic carbodiimide will be a high molecular weight, substantially cross-linked polymer. Representative compounds containing more than two free isocyanate groups which may be used include 2,4,6-triisocyanato toluene, p-isocyanatophenyl 2,4-diisocyanatophenyl ether, and compounds which are prepared from trifunctional reactants, such as the reaction product of 1 mole of castor oil with 3 moles of a diisocyanate, so as to obtain a compound having three free isocyanate groups. It is readily apparent that any of a wide variety of organic compounds containing more than two free isocyanate groups may be used in the process of the present invention.

Representative examples of the useful phosphonamides

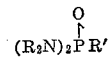

are: N,N,N',N'-tetraethyl methylphosphonaminde, N,N,N',N'-tetrapropyl methylphosphonamide, N,N,N',N'-tetramethyl methylphosphonamide, N,N,N',N'-tetraethyl ethylphosphonamide, N,N,N',N'-tetramethyl propylphosphonamide, and N,N,N',N'-tetrabutyl isobutylphosphonamide. These compounds are prepared by the reaction of the corresponding phosphonyl dihalide with a secondary aliphatic amine

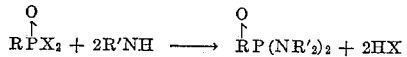

The following are representative examples of phosphonates

which are useful in the process of the subject invention: dimethyl methylphosphonate, diethyl methylphosphonate, dipropyl methylphosphonate, diisopropyl methylphosphonate, diethyl ethylphosphonate, di(2-bromoethyl) ethylphosphonate, di-n-butyl ethylphosphonate, diethyl vinylphosphonate, di(2-chloroethyl) vinylphosphonate, diethyl propylphosphonate, diethyl allylphosphonate, dimethyl alpha-methylvinylphosphonate, di-n-butyl n-amylphosphonate, and di(2-chloroethyl) vinylphosphonate. The di-(2-chloroethyl) vinylphosphonate is preferred. These compounds are sometimes prepared by the Michaelis-Arbuzov reaction

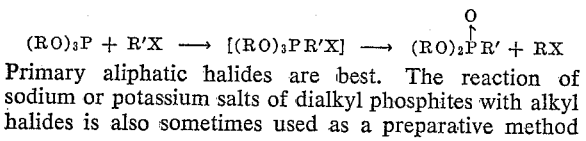

Primary aliphatic halides are best. The reaction of sodium or potassium salts of dialkyl phosphites with alkyl halides is also sometimes used as a preparative method

Representative examples of phosphoramides

useful in the process of the subject invention are: hexamethylphosphoramide, hexaethylphosphoramide, hexapropylphosphoramide, and hexa-iso-butylphosphoramide. Hexamethylphosphoramide is preferred. These compounds are made by the reaction of phosphorus oxychloride with secondary aliphatic amines $$POCl_3 + 3R_2NH \rightarrow PO(NR)_3 + 3HCl$$

Representative examples of phosphates $(RO)_3P \rightarrow O$ which serve as catalysts are: trimethylphosphate, diethylmethylphosphate, triethylphosphate, dimethylpropylphosphate, methyldipropylphosphate, ethyldipropylphosphate, diethylpropylphosphate, tripropylphosphate, triisopropylphosphate, ethyldibutylphosphate, tributylphosphate, trimethallylphosphate, ethyl dimethallylphosphate, triallylphosphate, and triamylphosphate. These compounds can be made by the reaction of silver phosphate with an excess of an alkyl halide,

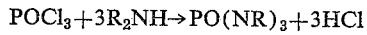

or by the reaction of an alcohol with phosphorus oxychloride in the presence of a tertiary amine base.

The $(RO'')_3P \rightarrow O$ catalysts are made by the reaction of the corresponding phenol R''OH with phosphorus oxychloride in the presence of a tertiary amine base. Representative examples of these triarylphosphates are triphenylphosphate, tricresylphosphate, tri-p-methoxyphenylphosphate, tri-p-tertbutylphenylphosphate, and tri-m-ethylphenylphosphate.

The triarylamidophosphate catalyst, $(R''NH)_3P \rightarrow O$ is made by the reaction of the corresponding aromatic primary amine R''NH$_2$ with phosphorus oxychloride POCl$_3$. Representative examples of these catalysts are: triphenylamidophosphate, tri-o-tolylamidophosphate, tri-m-ethoxyphenylamidophosphate, and tri-p-isopropylphenylamidophosphate.

The carbodiimides which are prepared according to the process of this invention have a number of interesting uses in chemical synthesis due to the reactivity of the N=C=N group or groups. The carbodiimides may be reacted with soda cellulose to form a modified cellulose as disclosed in U.S. Patent 2,415,043. The products of the reaction, depending on the particular conditions, are useful as textile sizes, coating compositions and molding powders. In addition, the polymeric compounds containing a plurality of carbodiimide linkages which are prepared from organic compounds containing two or more free isocyanate groups have a wide variety of uses, such as in fibers, films, sheets, elastomers, etc.

In carrying out the process of the present invention the organic isocyanate is treated at atmospheric pressure with a catalytic amount of one of the foregoing compounds. Accordingly, amounts of from about 0.1 to 10 mole percent can be used. As the organic carbodiimide is formed, carbon dioxide is liberated. The progress of the reaction may be followed by observing the evolution of this gas. In order to carry out the reaction at a convenient rate it is usually desirable to heat the organic isocyanate with the catalyst at a temperature from about 40 to 160° C. It is to be understood that with particularly active organic isocyanates and catalysts, heating may not be necessary. If, on the other hand, no catalyst is present, substantially no carbodiimide is formed when the organic isocyanates are heated to atmospheric pressure. For example, phenyl isocyanate may be heated at 160° C. for 2 days without change.

The process of the present invention may be carried out in bulk or in solution depending on the particular organic isocyanate being used. Thus, when the organic isocyanate is a solid, it may be dissolved in a solvent inert to both the catalyst and the organic isocyanate, such as benzene, toluene, xylene, etc., and the appropriate amount of phosphorus-containing catalyst added. Depending on the solubility of the resulting carbodiimide and the solvent employed, recovery is accomplished by either evaporating the solvent from the soluble organic carbodiimide or filtering off the insoluble organic carbodiimide. In the cases where the organic isocyanate reactant is itself a liquid, the use of an inert solvent is not necessary.

Representative examples illustrating the present invention follow.

*Example 1*

A reaction flask is used which is equipped with a thermometer, a magnetic stirrer, and a reflux condenser. The flask is closed to the outside atmosphere except for an exit line which is attached to the top of the condenser and which leads to a bubbler tube containing a lime water solution.

0.005 molar part of bis(beta-chloroethyl) vinylphosphonate (commercially available from Monsanto) is added with stirring at room temperature to 0.45 molar part of phenylisocyanate contained in the reaction flask. External heat is applied to the reaction flask while agitation is maintained. At about 30° C. bubbles of carbon dioxide are evolved from the reaction mixture and precipitation of calcium carbonate begins to occur slowly in the bubbler tube. Over a period of an hour the temperature of the reaction mixture is raised to 150° C. Carbon dioxide is evolved briskly at this temperature. Heating is continued for another hour and the temperature of the reaction mass reaches about 190° C. Heating is then stopped.

The reaction mass is subsequently distilled under vacuum. Phenylisocyanate, B.P. 36–80° C. (214–30 mm.) is taken off first. Then about 39 parts of diphenylcarbodiimide is collected, B.P. 106–124° C. (0.4–0.9 mm.). This amounts to an 88% yield. The infrared spectrum of this product matches that of an authentic sample of diphenylcarbodiimide.

*Analysis.*—Calcd. for $C_{13}H_{10}N_2$: C, 80.4; H, 5.2; N, 14.4. Found: C, 79.2; H, 5.1; N, 14.1.

Example 2

0.005 molar part of hexamethylphosphoramide (commercially available from Monsanto) is added with stirring at room temperature to 0.45 molar part of phenylisocyanate contained in the apparatus described in Example 1. External heat is applied to the reaction flask while agitation is maintained. Evolution of carbon dioxide becomes briskly above about 113° C. The temperature of the reaction mixture is raised to about 120° C. during the first hour. Heating is continued for one more hour during which the temperature of the mixture is raised to 135° C. The evolution of carbon dioxide is substantially complete at this time.

The reaction mixture is distilled under vacuum. Unreacted phenylisocyanate, B.P. 65–66° (2.7–25 mm.) is collected first. Then a light yellow liquid, B.P. 130–145° C. (1.4–2.6 mm.) is obtained. Its infrared spectrum is identical to that of a known specimen of diphenylcarbodiimide. The yield is 27%.

*Analysis.*—Calcd. for $C_{13}H_{10}N_2$: C, 80.4; H, 5.2; N, 14.4. Found: C, 79.8; H, 5.0; N, 14.4.

Example 3

0.004 molar part of triethyl phosphate is added with stirring at room temperature to 0.45 molar part of phenylisocyanate contained in the apparatus described in Example 1. External heat is applied and agitation is maintained. Carbon dioxide is briskly evolved when the temperature of the reaction mixture reaches 150° C. After 3 hours the temperature of the reaction mixture reaches 175° C. and the evolution of carbon dioxide is substantially complete.

The reaction mixture is distilled under vacuum. Unreacted phenylisocyanate is collected first, B.P. 99–110° C. (140 mm.). Then diphenylcarbodiimide is obtained, B.P. 112–118° C. (0.2–0.6 mm.). Its spectrum matches that of an authentic sample. The yield is 32%.

*Analysis.*—Calcd. for $C_{13}H_{10}N_2$: C, 80.4; H, 5.2; N, 14.4. Found: C, 80.4; H, 5.2; N, 15.0.

Example 4

0.005 molar part of bis(beta-chloroethyl)-beta-chloroethylphosphate (commercially available from Shea Chemical Co.) is agitated at 145–172° C. for 5 hours with 0.45 molar part of phenylisocyanate contained in the apparatus described in Example 1. Carbon dioxide is steadily evolved during this period. The reaction mixture is distilled under vacuum. A 20% of diphenyl-carbodiimide is obtained. Its infrared spectrum matches that of an authentic sample of diphenylcarbodiimide.

Example 5

0.0041 molar part of triallylphosphate is introduced into 0.45 molar part of phenylisocyanate contained at room temperature in the apparatus described in Example 1. External heat is applied to the reaction flask and agitation is maintained. Carbon dioxide evolution occurs slowly when the temperature of the reaction mixture reaches 30° C.; it occurs moderately at 130° C. and briskly at 163° C. The reaction mixture is agitated for 2.75 hours at 163° C.

The reaction mixture is then heated under vacuum. Unreacted phenylisocyanate is collected, B.P. 80° C. (47 mm.). Then diphenylcarbodiimide, B.P. 110–124° C. (1.2–1.3 mm.) is obtained in the last fraction. The yield is 4.8%.

Example 6

0.45 molar part of phenylisocyanate is agitated at reflux at atmospheric pressure with 0.039 molar part of triphenylphosphate for 21 hours. Carbon dioxide is steadily evolved during most of this period. The reaction mixture is then fractionally distilled to give a 63% yield of diphenylcarbodiimide, B.P. 126–127° C. (1.2–1.5 mm.). Its infrared spectrum matches that of an authentic sample of diphenylcarbodiimide.

Example 7

0.45 molar part of phenylisocyanate is agitated at reflux at atmospheric pressure with 0.004 molar part of triphenylamidophosphate. Carbon dioxide is evolved during most of this period. The reaction mixture is then fractionally distilled to give a 67% yield of diphenylcarbodiimide.

Example 8

19 parts of p-ethoxyphenyl isocyanate, 43.3 parts of anh. toluene and 0.5 part of bis($\beta$-chloroethyl) vinylphosphonate are heated under reflux for 18 hours. The reaction mixture is then allowed to cool and the toluene and any unreacted isocyanate are removed by distillation. The product, N,N'-di(p-ethoxyphenyl)carbodiimide, is an oil. It is identified by means of its infrared spectrum containing the carbodiimide adsorption band at 4.65 microns.

Example 9

23 parts of 2-methyl-4-chlorophenyl isocyanate, 43.3 parts of anhydrous toluene and 0.5 part of hexamethylphosphoramide are heated under reflux for 18 hours. The toluene and any unreacted isocyanate are then removed by distillation. The solid residue is shown to be N,N'-di(2-methyl-4-chlorophenyl)carbodiimide by its infrared spectrum.

Example 10

10 parts of cyclohexyl isocyanate, 34.6 parts of anh. toluene and 0.5 part of bis($\beta$-chloroethyl) vinylphosphonate are heated under reflux for 18 hours. The solvent and unreacted isocyanate are removed by distillation giving dicyclohexylcarbodiimide, B.P. 154°/11 mm., which is identified by its infrared spectrum.

Example 11

Example 1 is repeated substituting a molar equivalent amount N,N,N',N'-tetradodecyl dodecylphosphonamide for the catalyst used in Example 1. Essentially equivalent results are obtained. Diphenylcarbodiimide, B.P. 163°/11 mm., is obtained and further identified by means of its infrared spectrum.

It is to be understood that any organic isocyanate free of substituents reactive with an isocyanate group may be utilized in the preceding examples to give substantially the same results. Such organic isocyanates include monoisocyanates, polyisocyanates, and compounds containing more than two free isocyanate groups, all a hereinbefore described. It is also to be understood that any of the designated representative examples of catalysts may be substituted for those of the preceding examples to give substantially the same results.

This application is a continuation-in-part of application Serial No. 806,995 filed April 17, 1959, now abandoned, which in turn is a continuation-in-part of application Serial No. 687,605, filed October 2, 1957, now abandoned.

As many apparently widely different embodiments of this invention may be made with departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of preparing organic carbodiimides from organic isocyanates free of substituents of Zerewitinoff active hydrogen, said organic isocyanate being selected from the group consisting of benzene isocyanates, lower alkyl benzene isocyanates, lower alkoxy benzene isocyanates, halobenzene isocyanates, nitrobenzene isocyanates, naphthalene isocyanates, biphenyl isocyanates, diphenyl ether isocyanates, alkane isocyanates containing from 1 to 18 carbons, alkene isocyanates containing from 3 to 18 carbons, cyclohexane isocyanates, lower alkyl cyclohexane isocyanates, and decahydronaphthalene isocyanates, one to three isocyanate groups being present in said isocyanate, the improvement which comprises heating, together said isocyanate, at a temperature in the range of 30° to 190° C., from 0.001 to 0.1 mole per mole of said isocyanate of a catalyst elected from the group consisting of (1) phosphates of the formula $(RO)_3PO$, (2) phosphates of the formula $(R''O)_3PO$, (3) phosphonates of the formula $(RO)_2P(O)R'$, (4) phosphoramides of the formula $(R_2N)_3PO$, (5) phosphonamides of the formula $(R_2N)_2P(O)R'$ and (6) triarylamidophosphates of the formula $(R''NH)_3PO$, in which catalysts R and R' are selected from the group consisting of alkyl groups of 1 to 12 carbons, alkenyl groups of 2 to 12 carbons and haloalkyl groups of 1 to 12 carbons, and R'' is selected from the group consisting of phenyl, lower alkyl phenyl, lower alkoxy phenyl and halo phenyl groups, said organic isocyanate being heated in the presence of said catalyst until the evolution of carbon dioxide is substantially complete.

2. The process of claim 1 wherein the catalyst is hexamethylphosphoramide.

3. The proces of claim 1 wherein the catalyst is bis-(beta-chloroethyl) vinylphosphonate.

References Cited in the file of this patent

Staudinger et al.: Helv. Chim. Acta., vol. 2, pp. 619–635 (1919).

Staudinger et al.: Helv. Chim. Acta., vol. 4, pp. 861–886 (1921).

Staudinger et al.: Helv. Chim. Acta., vol. 5, pp. 75–86 (1922).